(12) United States Patent
Chapman et al.

(10) Patent No.: US 12,742,726 B2
(45) Date of Patent: Sep. 22, 2026

(54) BEAM PROFILER CERTIFICATION AND CALIBRATION

(71) Applicant: The Boeing Company, Arlington, VA (US)

(72) Inventors: Eric Chapman, Lake Tapps, WA (US); Dalton Wyllie Hamburg, Bothell, WA (US); Matthew Carl Johnson, Auburn, WA (US)

(73) Assignee: The Boeing Company, Arlington, VA (US)

( * ) Notice: Subject to any disclaimer, the term of this patent is extended or adjusted under 35 U.S.C. 154(b) by 317 days.

(21) Appl. No.: 18/643,864

(22) Filed: Apr. 23, 2024

(65) Prior Publication Data

US 2025/0327740 A1 Oct. 23, 2025

(51) Int. Cl.
*G01N 21/27* (2006.01)

(52) U.S. Cl.
CPC ..... *G01N 21/274* (2013.01); *G01N 2201/127* (2013.01)

(58) Field of Classification Search
USPC .......................................................... 73/1.01
See application file for complete search history.

(56) References Cited

U.S. PATENT DOCUMENTS

| | | | | |
|---|---|---|---|---|
| 11,099,063 | B2 * | 8/2021 | Percival | G01R 31/2635 |
| 12,467,826 | B2 * | 11/2025 | Damazo | G01J 1/08 |
| 2021/0120196 | A1 | 4/2021 | Jo | |

FOREIGN PATENT DOCUMENTS

| | | | | |
|---|---|---|---|---|
| AU | 2014343422 | A1 * | 5/2016 | G01J 1/4257 |
| CN | 2718553 | Y | 8/2005 | |
| CN | 117147106 | A | 12/2023 | |
| EP | 4137887 | A1 | 2/2023 | |
| JP | 2009100048 | A | 5/2009 | |

OTHER PUBLICATIONS

European Patent Office, Extended European Search Report Issued in Application No. 25171510.8, Nov. 3, 2025, 16 pages.

Bai, Z. et al., "Research on the Calibration Technique of the Low-Light-Level Remote Sensing Camera," AOPC 2020: Optical Sensing and Imaging Technology, Proceedings of SPIE, vol. 11567, Nov. 5, 2020, 6 pages.

(Continued)

*Primary Examiner* — Walter L Lindsay, Jr.
*Assistant Examiner* — Warren K Fenwick
(74) *Attorney, Agent, or Firm* — Alleman Hall LLP

(57) ABSTRACT

A calibration tool for a beam profiler is disclosed. The calibration tool includes an integrating sphere configured to receive laser light emitted from a laser and generate diffuse laser light. A sensor system is configured to output an expected intensity value of the diffuse laser light. An interface is configured to align a beam profiler with the integrating sphere to direct the diffuse laser light to be incident on an array of pixels of a beam sensor of the beam profiler. The array of pixels of the beam sensor is configured to output a plurality of native intensity values of the diffuse laser light. A computing system is configured to calibrate the beam profiler based at least on differences between the plurality of native intensity values of the diffuse laser light and the expected intensity value of the diffuse laser light.

20 Claims, 7 Drawing Sheets

(56) References Cited

OTHER PUBLICATIONS

Eppeldauer, G. P., Ed., Optical Radiation Measurements Based on Detector Standards, NIST Technical Note 1621, National Institute of Standards and Technology, Dec. 31, 2009, 380 pages.
Liu, Y. et al., "Research on the Nonuniformity Correction of Linear TDI CCD Remote Camera," Advanced Materials and Devices for Sensing and Imaging II, Proceedings of SPIE, vol. 5633, Nov. 8, 2004, 9 pages.
European Patent Office, Partial European Search Report Issued in Application No. 25171510.8, Sep. 19, 2025, 16 pages.
European Patent Office, Extended European Search Report Issued in Application No. 25171510.8, Mar. 11, 2025, 16 pages.

* cited by examiner

BEAM PROFILER CERTIFICATION AND CALIBRATION

FIELD

The present disclosure relates to optical measurement devices and, more specifically, to beam profilers utilized in the characterization of laser beams.

BACKGROUND

Laser systems find widespread application in various fields, including telecommunications, manufacturing, medical procedures, and scientific research. The performance and quality of these laser systems often depend on the precise characterization of the laser beam profile, which is essential for optimizing operational parameters and ensuring desired outcomes. In laser systems, understanding the spatial distribution of the laser beam intensity is crucial for assessing beam quality, divergence, and mode structure.

Beam profilers have emerged as a valuable tool for addressing these limitations by enabling real-time, high-resolution measurement of the entire cross-section of a laser beam. These devices capture spatial information across the beam profile, allowing for detailed analysis of intensity distribution, beam diameter, and other relevant parameters. The use of beam profilers has become increasingly prevalent in research laboratories, manufacturing facilities, and medical institutions where precise control and characterization of laser beams are paramount. These profilers aid in optimizing laser system performance, diagnosing potential issues, and ensuring consistent and accurate results in various applications.

SUMMARY

A calibration tool for a beam profiler is disclosed. The calibration tool includes a laser configured to emit laser light, an integrating sphere including an input port and an output port, a sensor system, an interface, and a computing system. The integrating sphere is configured to receive the laser light emitted from the laser via the input port and uniformly scatter the laser light off of an internal surface of the integrating sphere to generate diffuse laser light. The sensor system is arranged to observe the diffuse laser light within the integrating sphere and output an expected intensity value of the diffuse laser light. The interface is configured to align a beam profiler with the output port of the integrating sphere to direct the diffuse laser light to be incident on an array of pixels of a beam sensor of the beam profiler. The array of pixels of the beam sensor is configured to output a plurality of native intensity values of the diffuse laser light. The computing system includes a logic subsystem and a storage subsystem holding instructions executable by the logic subsystem to receive the expected intensity value of the diffuse laser light output by the sensor system, receive the plurality of native intensity values of the diffuse laser light output by the array of pixels of the beam sensor, and calibrate the beam profiler based at least on differences between the plurality of native intensity values of the diffuse laser light output by the array of pixels of the beam sensor and the expected intensity value of the diffuse laser light output by the sensor system.

The features and functions that have been discussed can be achieved independently in various embodiments or may be combined in yet other embodiments, further details of which can be seen with reference to the following description and drawings.

DETAILED DESCRIPTION

Figure 1:
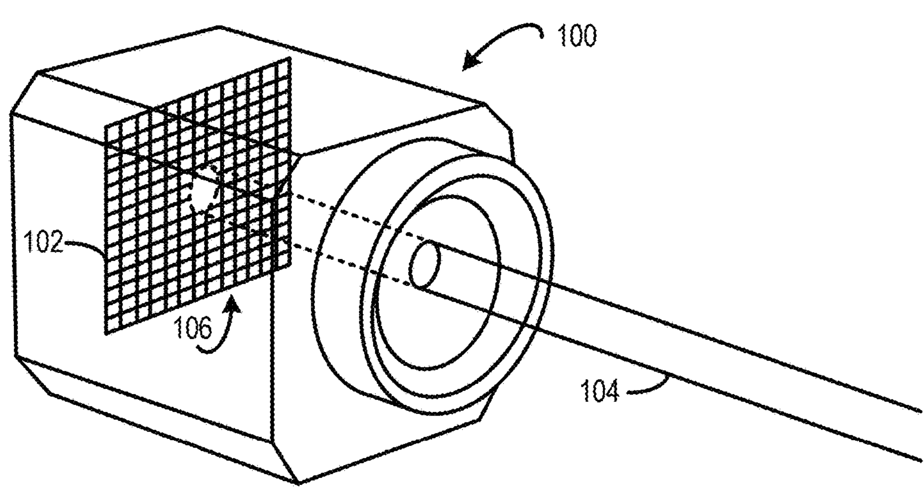
FIG. 1 schematically shows an example beam profiler.

Beam profilers are provided by original equipment manufacturers (OEMs) with a certificate of quality or conformance. However, there is no industry standard, test procedure, or method to certify and/or calibrate such beam profilers. Rather, the OEM will typically have a "gold standard" laser that is used to validate construction, which has drawbacks from a longevity standpoint for these beam profilers. In particular, once a beam profiler is put to use out in the field, there is no way to know if the beam profiler continues to accurately characterize a laser beam profile. Additionally, challenges arise when questioning if a laser beam has changed or if the condition of the laser beam profiler has changed when there is a discrepancy. Further, when a beam profiler is inevitably antiquated at the end of its operational lifecycle, there is no way to know that a new beam profiler is performing measurements similarly to the antiquated one in order to accurately characterize a laser beam profile.

Accordingly, the present disclosure is directed to an approach for certifying and/or calibrating a beam profiler. In one example, a laser is configured to emit laser light having designated properties (e.g., a designated intensity, a designated wavelength, a designated power level) into an integrating sphere to uniformly scatter the laser light off of an internal surface of the integrating sphere to generate diffuse laser light having a uniform spatial distribution. Properties of the diffuse laser light are observed by a sensor system, and more particularly, the sensor system outputs at least an expected (or designated) intensity value of the diffuse laser light. In other words, the sensor system confirms that the designated properties of the laser light are accurate. Further, the diffuse laser light is directed to be incident on an array of pixels of a beam sensor of the beam profiler, such that each pixel of the array receives the same diffuse laser light. The array of pixels of the beam sensor outputs a plurality of native intensity values of the diffuse laser light. As used herein, the term "native intensity values" refers to raw intensity values output by the beam sensor of the beam profiler without any correction or calibration being performed on the beam profiler as a result of the certification and/or calibration process. The native intensity values of the diffuse laser light output by the beam sensor are compared to the expected intensity value of the diffuse laser light output by the sensor system. The beam profiler can be calibrated based at least on differences between the plurality of native intensity values of the diffuse laser light output by the array of pixels of the beam sensor and the expected intensity value of the diffuse laser light output by the sensor system. Alternatively, the beam profiler can be certified as functioning properly based at least on each of the plurality of native intensity values of the diffuse laser light correlating to the expected intensity value of the diffuse laser light.

By using the integrating sphere to produce diffuse laser light having a constant irradiance and directing the diffuse laser light to each pixel of the array of the beam sensor, each pixel of the beam sensor can be certified and/or calibrated on an individual basis. Accordingly, the beam profiler can be certified as functioning properly or can be calibrated on a pixel-by-pixel basis to compensate for any variations in intensity values output by particular pixels of the beam sensor relative to the expected intensity value of the diffuse laser light. Such an approach allows for a beam profiler to be certified/calibrated in a physics-based manner that otherwise was previously not available. Moreover, the beam profiler may be repeatedly certified/calibrated over its operational lifespan using such an approach in order to ensure that the beam profiler remains functioning properly during that time.

FIG. 1 schematically shows an example beam profiler 100. The beam profiler 100 includes a beam sensor 102 configured to capture a beam profile of laser light 104 that is incident on the beam sensor 102. In some embodiments, the beam sensor 102 includes a charge-coupled device (CCD). In other embodiments, the beam sensor 102 includes a complementary metal-oxide-semiconductor (CMOS) device. In still other embodiments, the beam sensor 102 includes a different type of camera or optical sensor. The beam profiler 100 may include other optical components (not shown) that direct laser light to be incident on the beam sensor 102. The beam sensor 102 includes an array of pixels 106. Each pixel of the array of pixels 106 is configured to output an intensity value responsive to the laser light 104 incident on the pixel. The beam sensor 102 is configured to output a two-dimensional (or three-dimensional) plot of intensity values that represent the collective output of the array of pixels 106.

Figure 2:
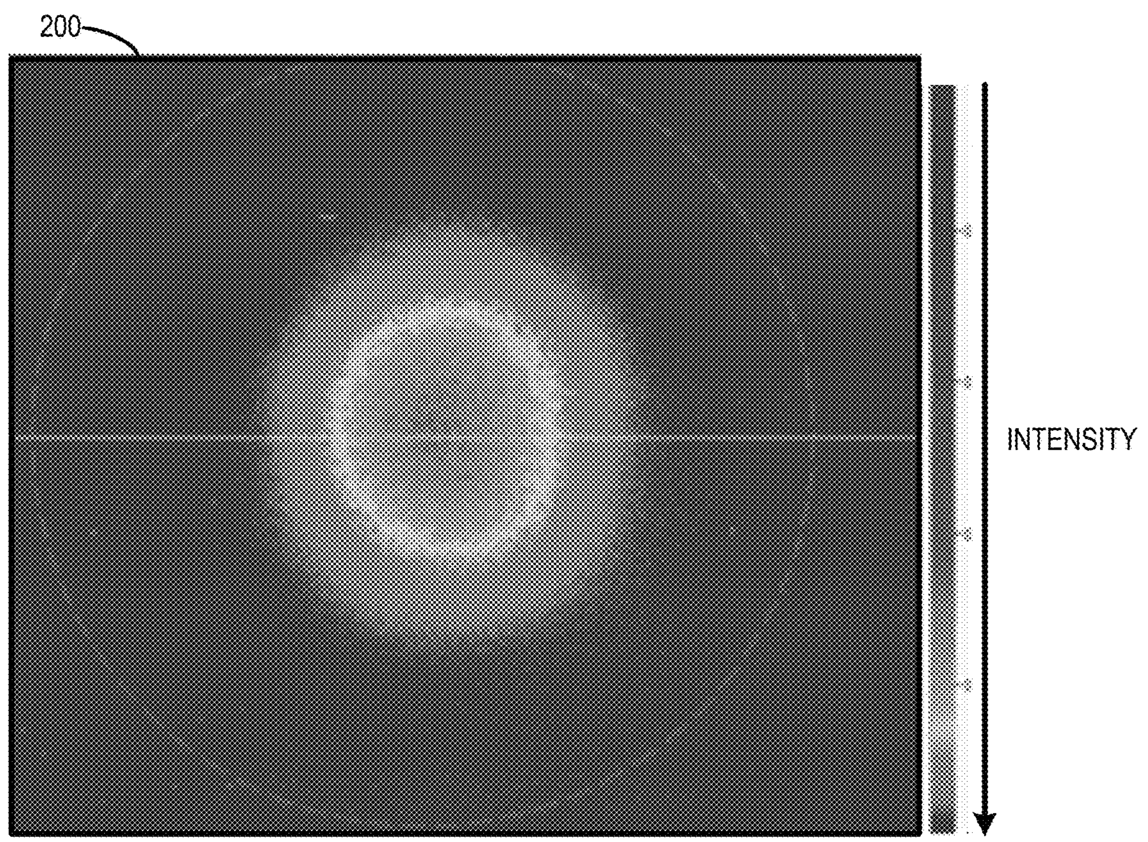
FIG. 2 shows an example two-dimensional plot of intensity values output that can be output by the beam profiler of FIG. 1.

FIG. 2 shows an example two-dimensional plot of intensity values 200 that is output by the beam profiler 100 based on the laser light 104. In this example, the variance in the magnitude of the intensity values corresponds to different shades of a greyscale in the two-dimensional plot of intensity values 200. The greater magnitudes of intensity values correspond to lighter shades of the greyscale and lesser magnitudes of intensity values correspond to darker shades of the greyscale. The two-dimensional plot of intensity values 200 shows how the intensity of the laser light (or laser beam) 104 varies across its profile. The two-dimensional plot of intensity values 200 can provide information on the beam shape, size, and uniformity. For example, the two-dimensional plot of intensity values 200 can be used to characterize a beam diameter, beam waist parameters (e.g., diameter, position), beam divergence, and power density, among other parameters of the laser beam 104.

As discussed above, currently there is no industry standard, test procedure, or method to certify and/or calibrate beam profilers, such as the beam profiler 100 of FIG. 1. Rather, the OEM will typically have a "gold standard" laser that is used to validate construction. Once a beam profiler is deployed in the field, there typically is no way to know if the beam profiler continues to accurately characterize a laser beam profile. Additionally, challenges arise when questioning if a laser beam has changed or if the condition of the laser beam profiler has changed when there is a discrepancy.

Figure 3:
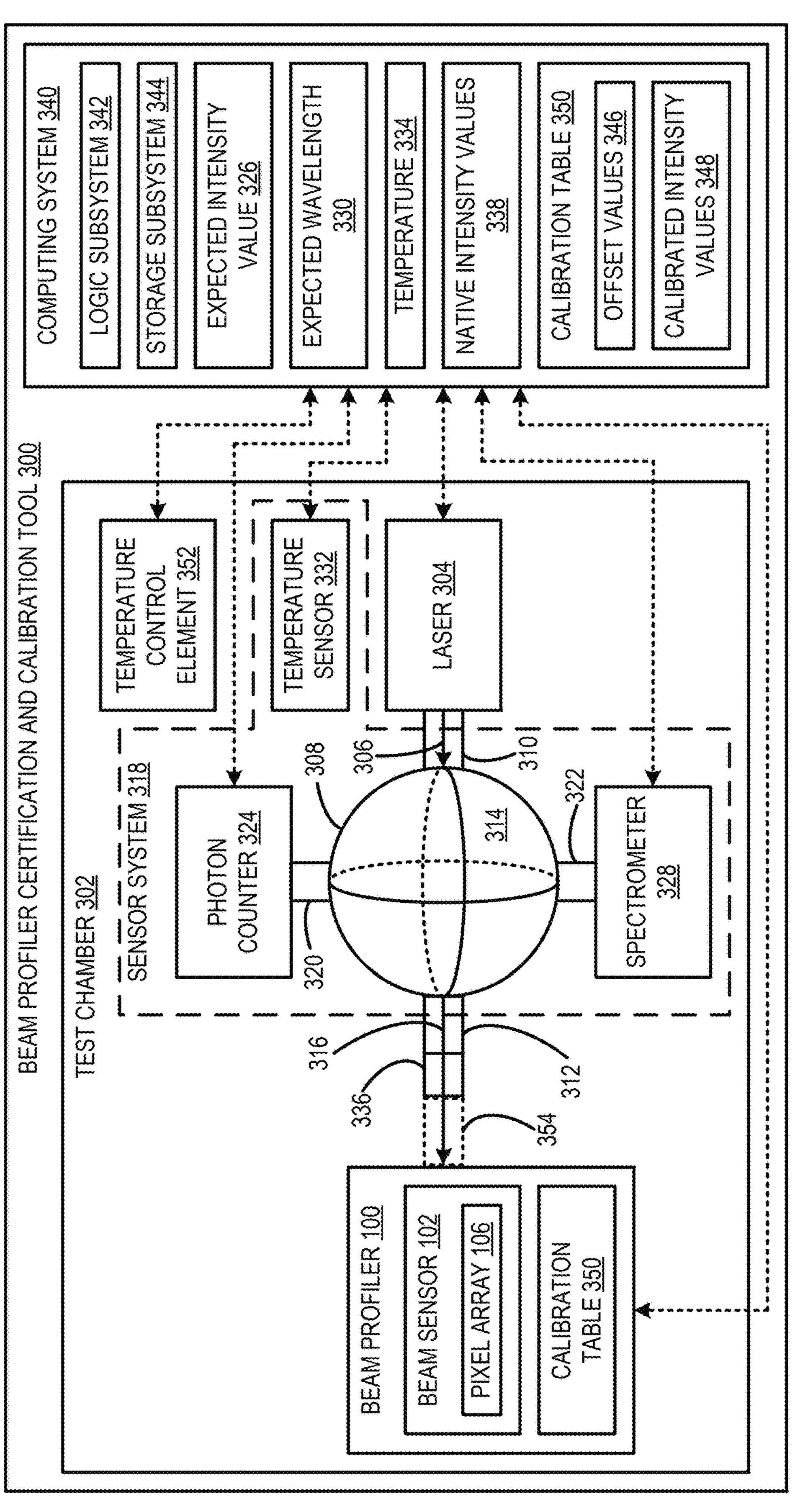
FIG. 3 schematically shows an example beam profiler certification and calibration tool.

To address such issues, a beam profiler certification and calibration tool can be used to perform certification/calibration of a beam profiler. FIG. 3 schematically shows an example beam profiler certification and calibration tool 300 (also referred to as tool 300). The tool 300 includes a test chamber 302 configured to regulate operating conditions during certification/calibration testing of a beam profiler, such as the beam profiler 100 of FIG. 1. The test chamber 302 may be configured to regulate any suitable operating conditions. For example, test chamber 302 may be configured to regulate temperature, barometric pressure, ambient lighting conditions, and other suitable operating conditions.

The tool 300 includes a laser 304 that is configured to emit laser light 306. The laser 304 serves as a control laser light source having known laser parameters. The laser 304 may have any suitable parameters (e.g., wavelength, intensity, power level) that allow for certification/calibration of a beam profiler. In some embodiments, one or more parameters of the laser 304 may be adjustable. As one example, in some embodiments, the laser 304 may be adjustable to output laser light in different wavelengths. As another example, in some embodiments, the laser 304 may be adjustable to output laser light at different power levels.

The tool 300 includes an integrating sphere 308 including an input port 310 and an output port 312. The integrating sphere 308 is configured to receive the laser light 306 emitted from the laser 304 via the input port 310 and uniformly scatter the laser light 306 off of an internal surface 314 of the integrating sphere 308 to generate diffuse laser light 316 having a uniform spatial distribution.

Figure 4:
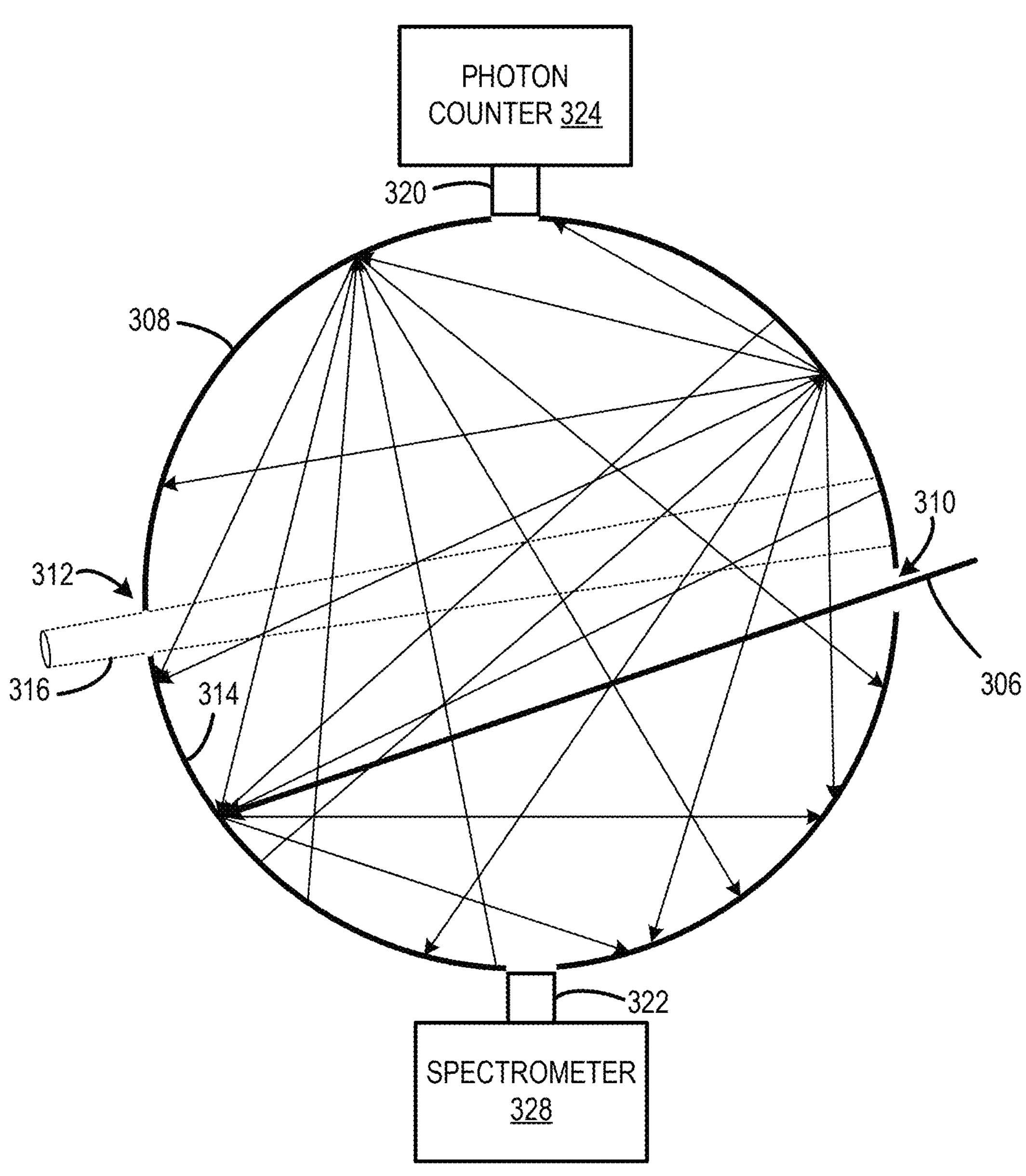
FIG. 4 schematically shows an integrating sphere of the tool of FIG. 3.

FIG. 4 schematically shows aspects of the integrating sphere 308 in greater detail. The integrating sphere 308 is an optical device designed to facilitate measurement of the total intensity/radiant flux of the laser light 306, regardless of the spatial distribution or angular dependence of the laser light 306. The integrating sphere 308 is a hollow, spherical chamber coated with a highly reflective (diffuse) material on its internal surface 314. The reflective coating ensures that light incident on the interior of the sphere is scattered in all directions uniformly. The integrating sphere 308 includes the input port 310 that allows the laser light 306 to enter into the integrating sphere 308. Once inside the integrating sphere 308, the laser light 306 undergoes multiple scattering events, including multiple reflections, due to the diffuse inner coating. This scattering process helps to homogenize the spatial distribution of the laser light and evenly distributes the laser light across the entire internal surface 314. The coating of the internal surface 315 of the integrating sphere 308 is designed to be highly reflective, minimizing absorption. Laser light 306 that has undergone multiple reflections and scattering exits the integrating sphere 308 through the output port 312 as diffuse laser light 316. In some embodiments, the interior cavity of the integrating sphere 308 may include baffles or other features (not shown) designed to ensure that only diffuse reflections can impinge on the beam sensor 102. The diffuse laser light 316 is spatially and angularly averaged, representing the total intensity/radiant flux of the laser light 306 emitted from the laser 304.

Returning to FIG. 3, the tool 300 includes a sensor system 318 arranged to observe the diffuse laser light 316 within the integrating sphere 308 and output one or more parameters that characterize the diffuse laser light 316. In the illustrated embodiment, the integrating sphere 308 includes a first viewport 320 and a second viewport 322. The sensor system 318 includes a photon counter 324 arranged to observe the diffuse laser light 316 in the integrating sphere 308 via the first viewport 320 and output an expected intensity value 326 of the diffuse laser light 316. The sensor system 318 further includes a spectrometer 328 arranged to observe the diffuse laser light 316 in the integrating sphere 308 via the second viewport 322 and output an expected wavelength value 330 of the diffuse laser light 316. In other embodiments, the sensor system 318 may include other types of devices that are configured to measure the expected intensity and wavelength of the diffuse laser light 316. The photon counter 324 and other reference sensors of the sensory system 318 may themselves be calibrated by well-known methods and procedures. In some embodiments, the sensor system 318 may include other sensor devices that are configured to characterize other parameters of the diffuse laser light 316.

In some embodiments, the sensor system 318 may include a temperature sensor 332 that is configured to output a temperature 334 in the test chamber 302. The measured temperature 334 may be used for feedback control of the temperature in the test chamber 302 in some embodiments.

Note that the sensor system 318 is indicated by dashed lines that encompass various sensors (e.g., the photon counter 324, the spectrometer 328, the temperature sensor 332) as well as the integrating sphere 308, but the sensor system 318 does not actually include the integrating sphere 308 itself.

The tool 300 includes an interface 336 configured to align the beam profiler 100 with the output port 312 of the integrating sphere 308 to direct the diffuse laser light 316 to be incident on the array of pixels 106 of the beam sensor 102 of the beam profiler 100. The interface 336 may include any suitable mechanism to hold the beam profiler in fixed alignment with the output port 312 of the integrating sphere 308 during certification/calibration of the beam profiler 100. For example, the interface may include a mechanical clamp or brace that is configured to secure the beam profiler 100 in place. The interface 336 enables the diffuse laser light 316 to be directed to each pixel of the array of pixels 106 to evaluate the functionality of each pixel on an individual basis. In response to detecting the diffuse laser light 316, the array of pixels 106 of the beam sensor 102 is configured to output a plurality of native intensity values 338 of the diffuse laser light. By directing the laser light 306 into the integrating sphere 308 to generate the diffuse laser light 316, each pixel of the array of pixels 106 of the beam sensor 102 can receive the same diffuse laser light 316 having the same characteristics. The color (wavelength) of laser light is of particular relevance because sensor pixels have quantum response characteristics which vary based on wavelength and intensity. Without use of the integrating sphere 308, the laser light 306 may be unevenly directed onto the array of pixels 106. For example, without use of the integrating sphere 308, some pixels of the array of pixels 106 may be only partially illuminated or not illuminated at all with the laser light 306. As such, without use of the integrating sphere 308, not all pixels of the array of pixels 106 can be accurately assessed for certification and/or calibration. Moreover, the intensity of the laser light 306 may vary across a waist of the laser beam, such that different pixels of the array of pixels 106 may receive laser light having different intensities that would make assessed for certification and/or calibration difficult/less accurate.

The tool 300 further includes a computing system 340 comprising a logic subsystem 342 and a storage subsystem 344 holding instructions executable by the logic subsystem 342 to execute computing operations to certify and/or calibrate the beam profiler 100. In one example, the storage subsystem 344 holds instructions executable by the logic subsystem 342 to receive the expected intensity value of the diffuse laser light 316 output by photon counter 324 of the sensor system 318. The storage subsystem 344 holds instructions executable by the logic subsystem 342 to receive the plurality of native intensity values 338 of the diffuse laser light 316 output by the array of pixels 106 of the beam sensor 102. The storage subsystem 344 holds instructions executable by the logic subsystem 342 to compare the expected intensity value 326 of the diffuse laser light to the native intensity values 338 of the diffuse laser light 316 output by each of the pixels of the array of pixels 106 of the beam sensor 102.

The storage subsystem 344 holds instructions executable by the logic subsystem 342 to certify that the beam profiler 100 is functioning properly based at least on the plurality of native intensity values 338 of the diffuse laser light 316 output by the array of pixels 106 of the beam sensor 102 correlating to the expected intensity value 326 of the diffuse laser light 316 output by the sensor system 318. In some embodiments, a native intensity value 338 output by a pixel of the array of pixels 106 correlates to the expected intensity value 326 output by the sensor system 318 if the two values match each other. In other embodiments, a native intensity value 338 output by a pixel of the array of pixels 106 correlates to the expected intensity value 326 output by the sensor system 318 if the native intensity value 338 is within a difference tolerance/threshold (e.g., <1% difference or 1-2 units of intensity difference) of each other. Any suitable difference tolerance/threshold may be used to certify whether or not a pixel is functioning properly.

The storage subsystem 344 holds instructions executable by the logic subsystem 342 to calibrate the beam profiler 100 based at least on differences between the plurality of native intensity values 338 of the diffuse laser light 316 output by the array of pixels 106 of the beam sensor 102 and the expected intensity value 326 of the diffuse laser light 316 output by the photon counter 324 of the sensor system 318.

In some embodiments, calibrating the beam profiler 100 includes, for each pixel of the array of pixels 106 of the beam sensor 102 that outputs a native intensity value 338 of the diffuse laser light 316 that does not correlate to the expected intensity value 326 of the diffuse laser light 316 output by the sensor system 318, apply a corrective offset value 346 to the native intensity value 338 to generate a calibrated intensity value 348. The corrective offset value 346 is a difference between the native intensity value 338 and the expected intensity value 326. The calibration operation is repeatedly performed for each pixel that outputs a native intensity value 338 that differs from the expected intensity value 326.

In some embodiments, calibrating the beam profiler may include associating the corrective offset values 346 and/or the calibrated intensity values 348 with corresponding pixels in the array of pixels 106 in a calibration table 350 and sending the calibration table 350 to the beam profiler 100.

The calibration table 350 can be stored in on-board memory of the beam profiler 100, and the beam profiler 100 can be configured to apply the corrective offset values 346 of the calibration table 350 to a plurality of native intensity values 338 output by a corresponding plurality of pixels of the beam sensor 102 to generate the plurality of calibrated intensity values 348 that accurately characterize light that is detected by the beam profiler 100.

In some embodiments, certification and/or calibration of the beam profiler may include the tool 300 sending certification and/or calibration data to other computing systems, such as post-processing software executed by a computing system. In some embodiments, the storage subsystem 344 may hold instructions executable by the logic subsystem 342 to apply the corrective offset values 346 to the native intensity values 338 output by the beam profiler 100 downstream in software of the computing system 340 (or another computing system that executes post-processing software for the output of the beam profiler 100) instead of on-board via hardware/firmware of the beam profiler 100. In some embodiments, the storage subsystem 344 may hold instructions executable by the logic subsystem 342 to send the calibration table 350 to post-processing software (executed by the computing system 340 or another computing system), so that the post-processing software can perform calibration of the output of the beam profiler 100 based least on the calibration table 350. In some embodiments, the storage subsystem 344 may hold instructions executable by the logic subsystem 342 to send a data indicating certification that the beam profiler 100 is functioning properly to post-processing software (executed by the computing system 340 or another computing system). The corrective offset values 346, the calibration table 350, and/or the data indicating certification of beam profiler 100 may be utilized by any form of post-processing software. In some embodiments, the tool 300 may send certification and/or calibration data to the beam profiler 100 and/or a computing system that executes the post processing software. In some embodiments, the post processing software may be utilized to perform calibration operations for a beam profiler that does not have the ability to perform on-board calibration.

Figures 5, 6:
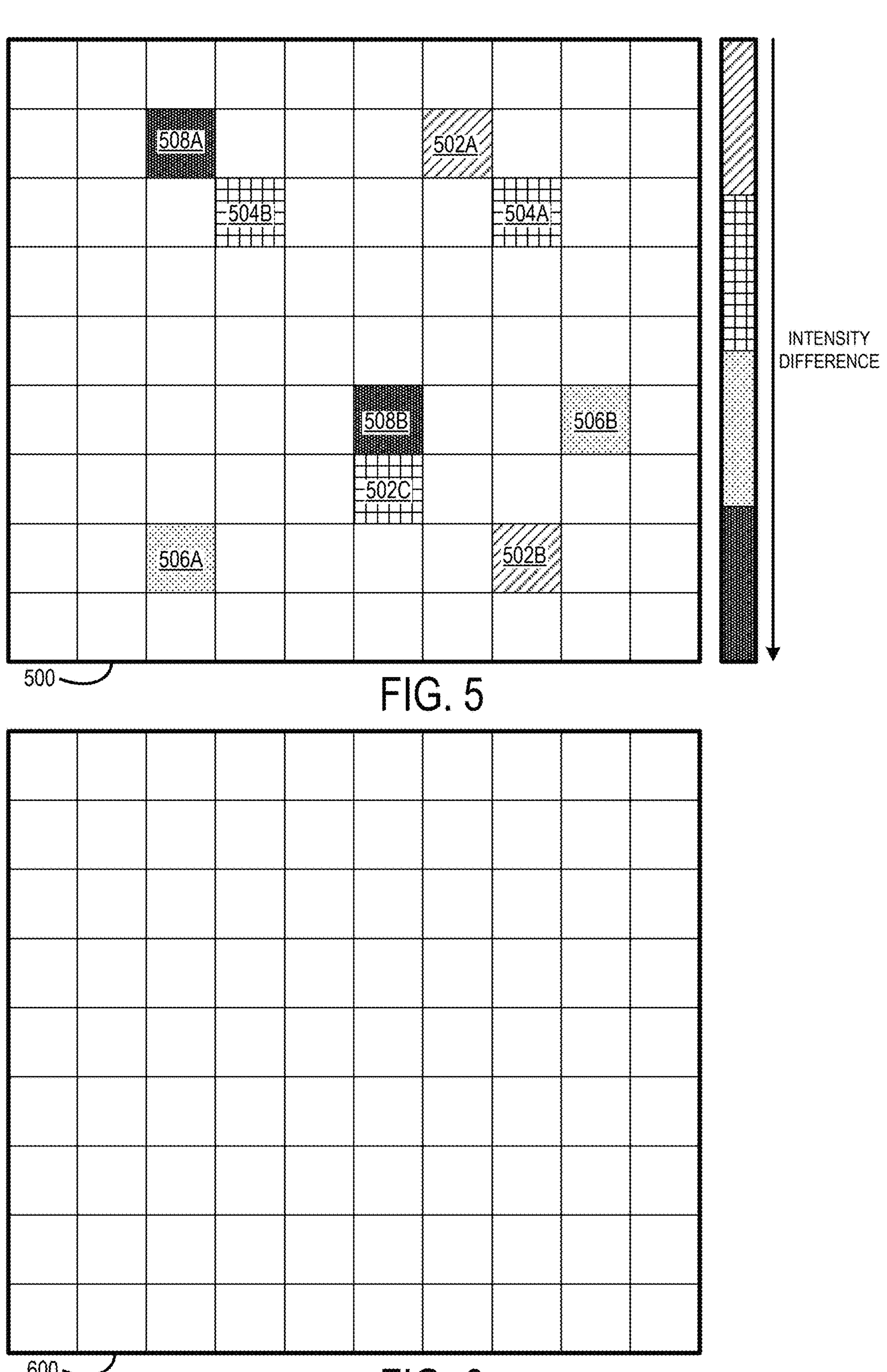
FIG. 5 shows an example two-dimensional plot of native intensity values output by a beam profiler based on detecting diffuse laser light.
FIG. 6 shows an example two-dimensional plot of calibrated intensity values that is generated by applying corrective offset values to the two-dimensional plot of native intensity values of FIG. 5.

FIG. 5 shows an example two-dimensional plot 500 of native intensity values output by the beam profiler 100 based on detecting the diffuse laser light 316. In the illustrated example, the white pixels visually represent the correct intensity values that correlate to the expected intensity value 326 of the diffuse laser light 316. Pixels 502A, 502B, 504A, 504B, 504C, 506A, 506B, 508A, 508B visually represent native intensity values that differ from the expected intensity value 326 of the diffuse laser light 316. Different pixels have different native intensity values the differ to varying degrees with respect to the expected intensity value 326 of the diffuse laser light 316. Accordingly, different offset values are applied to correct the different native intensity values. For example, a first corrective offset value is applied to pixels 502A, 502B. A second corrective offset value that is greater than the first corrective offset value is applied to pixels 504A, 504B, 504C. A third corrective offset value that is greater than the second corrective offset value is applied to pixels 506A, 506B. A fourth corrective offset value that is greater than the third corrective offset value is applied to pixels 508A, 508B. The different corrective offset values compensate for the differences between the native intensity values and the expected intensity value 326 of the diffuse laser light 316.

As discussed above, in some embodiments, the corrective offset values can be arranged in the calibration table 350. The beam profiler 100 can be configured to apply the calibration table 350 to the native intensity values 338 to generate the calibrated intensity values 348.

FIG. 6 shows an example two-dimensional plot 600 of the calibrated intensity values that is generated by applying the corrective offset values to the two-dimensional plot 600 of the native intensity values of FIG. 5. Although some of the pixels of the array of pixels 106 of the beam sensor 102 output native intensity values that differ from the expected intensity value 326 of the diffuse laser light 316, by applying the corrective offset values to native intensity values of select pixels that differ from the expected intensity value 326, the beam profiler 100 can output a two-dimensional plot of calibrated intensity values 348 that accurately correlates to the expected intensity value 326 of the diffuse laser light 316. In other words, the beam profiler 100 can be calibrated to provide accurate readings of laser light.

Returning to FIG. 3, in some embodiments, additional parameters that characterize additional aspects of the laser light 306 may be used to certify and/or calibrate a beam profiler, such as the beam profiler 100. For example, the pixels of the array of pixels 106 may behave differently in response to detecting laser light in different wavelengths. Accordingly, in some embodiments, the sensor system 318 is configured to output an expected wavelength value 330 of the diffuse laser light 316 (e.g., via the spectrometer 328). Further, the storage subsystem 344 may hold instructions executable by the logic subsystem 342 to receive the expected wavelength value 330 of the diffuse laser light 316 output by the sensor system 318, and calibrate the beam profiler 100 further based at least on the expected wavelength value 330 of the diffuse laser light 316. More particularly, the offset values 346 may be associated with the particular expected wavelength value 330 of the diffuse laser light 316.

In some embodiments, the computing system 340 may be configured to control the laser 304 to emit laser light in different wavelengths for certification and/or calibration of the beam profiler 100. In one example, the storage subsystem 344 holds instructions executable by the logic subsystem 342 to send control signals to the laser 304 to sequentially emit a plurality of samples of laser light 306 at a plurality of different wavelengths into the integrating sphere 308. The integrating sphere 308 is configured to generate a plurality of samples of diffuse laser light 316 at the plurality of different wavelengths. Each sample of the diffuse laser light 316 has a uniform spatial distribution. The plurality of samples of diffuse laser light 316 at the different wavelengths are sequentially directed to be incident on the array of pixels 106 of the beam sensor 102 of the beam profiler 100. The storage subsystem 344 holds instructions executable by the logic subsystem 342 to receive a plurality of expected intensity values 326 of the plurality of samples of diffuse laser light 316 at the plurality of different wavelengths output by the photon counter 324 of the sensor system 318. The storage subsystem 344 holds instructions executable by the logic subsystem 342 to receive a plurality of expected wavelength values 330 of the plurality of samples of diffuse laser light 316 output by the spectrometer 328 of the sensor system 318. In other words, the photon counter 324 and the spectrometer 328 are used in conjunction to collectively characterize the wavelength and intensity level of each sample of the diffuse laser light 316.

Further, the storage subsystem 344 holds instructions executable by the logic subsystem 342 to receive a plurality of sets of native intensity values 338 corresponding to the plurality of samples of diffuse laser light 316 at the plurality of wavelengths output by the beam profiler 100. Each set of native intensity values 338 at a different wavelength is output by the pixels of the array of pixels 106 of the beam sensor 102. The storage subsystem 344 holds instructions executable by the logic subsystem 342 to calibrate the beam profiler 100 based at least on differences between the plurality of sets of native intensity values 338 corresponding to the plurality of samples of diffuse laser light 316 at the plurality of different wavelengths output by the beam profiler 100 and the plurality of expected intensity values 326 of the plurality of samples of diffuse laser light at the plurality of different wavelengths output by the sensor system 318. For example, a plurality of calibration tables 350 may be generated for the beam profiler 100 that are associated with the plurality of different wavelengths that are used by the tool 300 for testing. In some embodiments, the computing system 340 may be configured to extrapolate the data generated from the assessment for the plurality of different wavelengths by fitting the differences between the expected intensity values and native intensity values to a curve of differences that spans across a range of wavelengths in the electromagnetic spectrum.

In some examples, the pixels of the array of pixels 106 of the beam profiler 100 may behave differently in response to detecting laser light at different power levels. As such, in some embodiments, the computing system 340 may be configured to control the laser 304 to emit laser light at different power levels for certification and/or calibration of the beam profiler 100. In one example, the storage subsystem 344 holds instructions executable by the logic subsystem 342 to send control signals to the laser 304 to sequentially emit a plurality of samples of laser light 306 at a plurality of different power levels into the integrating sphere 308. The integrating sphere 308 is configured to generate a plurality of samples of diffuse laser light 316 at the plurality of different power levels. Each sample of the diffuse laser light 316 has a uniform spatial distribution. The plurality of samples of diffuse laser light 316 are sequentially directed to be incident on the array of pixels 106 of the beam sensor 102 of the beam profiler 100. The storage subsystem 344 holds instructions executable by the logic subsystem 342 to receive a plurality of expected intensity values 326 of the plurality of samples of diffuse laser light 316 at the plurality of different power levels output by the photon counter 324 of the sensor system 318.

Further, the storage subsystem 344 holds instructions executable by the logic subsystem 342 to receive a plurality of sets of native intensity values 338 corresponding to the plurality of samples of diffuse laser light 316 at the plurality of power levels output by the beam profiler 100. Each set of native intensity values 338 at a different power level is output by the pixels of the array of pixels 106 of the beam sensor 102. The storage subsystem 344 holds instructions executable by the logic subsystem 342 to calibrate the beam profiler 100 based at least on differences between the plurality of sets of native intensity values 338 corresponding to the plurality of samples of diffuse laser light 316 at the plurality of different power levels output by the beam profiler 100 and the plurality of expected intensity values 326 of the plurality of samples of diffuse laser light at the plurality of different power levels output by the sensor system 318. For example, a plurality of calibration tables 350 may be generated for the beam profiler 100 that are associated with the plurality of different power levels that are used by the tool 300 for testing. In some embodiments, the computing system 340 may be configured to extrapolate the data generated from the assessment for the plurality of different power levels by fitting the differences between the expected intensity values and native intensity values to a curve of differences that spans across a range of power levels.

In some examples, the pixels of the array of pixels 106 of the beam profiler 100 may behave differently in response to detecting laser light while operating at different temperatures. As such, in some embodiments, the tool 300 may further comprise a temperature control element 352 that is configured to adjust a temperature 334 within the test chamber 302 to a plurality of different temperatures for certification and/or calibration of the beam profiler 100. In one example, the storage subsystem 344 holds instructions executable by the logic subsystem 342 to send control signals to the laser 304 to sending control signals to the temperature control element 352 to adjust a temperature within the test chamber 302 to the plurality of different temperatures. The storage subsystem 344 holds instructions executable by the logic subsystem 342 to send control signals to the laser 304 to sequentially emit a plurality of samples of the laser light 306 into the integrating sphere 308 while at the plurality of different temperatures. The integrating sphere 308 is configured to generate a plurality of samples of diffuse laser light 316 having a uniform spatial distribution while at the plurality of different temperatures. The plurality of samples of diffuse laser light 316 are sequentially directed to be incident on the array of pixels 106 of the beam sensor 102 of the beam profiler 100.

Further, the storage subsystem 344 holds instructions executable by the logic subsystem 342 to receive a plurality of expected intensity values 326 of the plurality of samples of diffuse laser light 316 output by the sensor system 318 while at the plurality of different temperatures 334. The storage subsystem 344 holds instructions executable by the logic subsystem 342 to receiving a plurality of sets of native intensity values 338 corresponding to the plurality of samples of diffuse laser light 316 output by the beam profiler 100 while at the plurality of different temperatures 334. The storage subsystem 344 holds instructions executable by the logic subsystem 342 to calibrate the beam profiler 100 based at least on differences between the plurality of sets of native intensity values 338 corresponding to the plurality of samples of diffuse laser light 316 output by the beam profiler 100 while at the plurality of different temperatures 334 and the plurality of expected intensity values 326 of the plurality of samples of diffuse laser light 316 output by the sensor system 318 while at the plurality of different temperatures 334.

By performing the certification and/or calibration of the beam profiler 100 across ranges of different parameters (e.g., wavelengths, power levels, temperatures), the beam profiler 100 may be robustly certified and/or calibrated for operation across a range of different operating conditions.

In some embodiments, the tool 300 may be configured to certify and/or calibration a beam profiler, such as the beam profiler 100 for light blooming that can occur between pixels of the array of pixels 106. In one example, the tool 300 further comprises an optical mask 354 arranged intermediate the beam profiler 100 and the output port 312 of the integrating sphere 308. The optical mask 354 is configured to allow the diffuse laser light 316 to reach a designated pixel of the array of pixels 106 of the beam sensor 102 and block the diffuse laser light 316 from being incident on a subset of neighboring pixels of the array of pixels 106 that surround the designated pixel. When the optical mask 354 is used, under ideal conditions, native intensity values output by the subset of neighboring pixels should correlate to a no-light value (e.g., zero). However, due to light bloom phenomena light from the designated pixel may bleed into the neighboring pixels if the designated pixel in some instance. The storage subsystem 344 holds instructions executable by the logic subsystem 342 to receive a plurality of native intensity values 338 corresponding to the subset of neighboring pixels. The storage subsystem 344 holds instructions executable by the logic subsystem 342 to, for each pixel of the subset of neighboring pixels of the beam sensor 102 that outputs a native intensity value that does not correlate to a no-light value, apply a corrective offset value to the native intensity value to generate the no-light value. Otherwise, if the neighboring pixels all output no-light values, then the designated pixel may be certified as functioning properly.

In some embodiments, the optical mask 354 may be configured to allow for a single pixel in the array of pixels 106 to be illuminated by the diffuse laser light 316 at one time. Further, the optical mask 354 may be configured to, for each pixel of the array of pixels 106, allow the pixel to be illuminated by the diffuse laser light 316 while blocking the diffuse laser light 316 from reaching any of the other pixels of the array of pixels 106. In other words, the optical mask 354 may be configured to switch which pixel is the designated pixel in order to evaluate each of the array of pixels 106 for light blooming. In other embodiments, the optical mask 354 may be configured to allow a plurality of designated pixels to be illuminated at the same time. The plurality of pixels may be spaced far enough apart on the beam sensor 102, such that illumination of one designated pixel does not bleed into pixels that are neighbors to another designated pixel.

The optical mask 354 may take any suitable form. In some examples, the optical mask 354 includes a spatial light modulator. In other examples, the optical mask 354 includes a metal aperture mask. In still other examples, the optical mask 354 may take another form.

Figure 7:
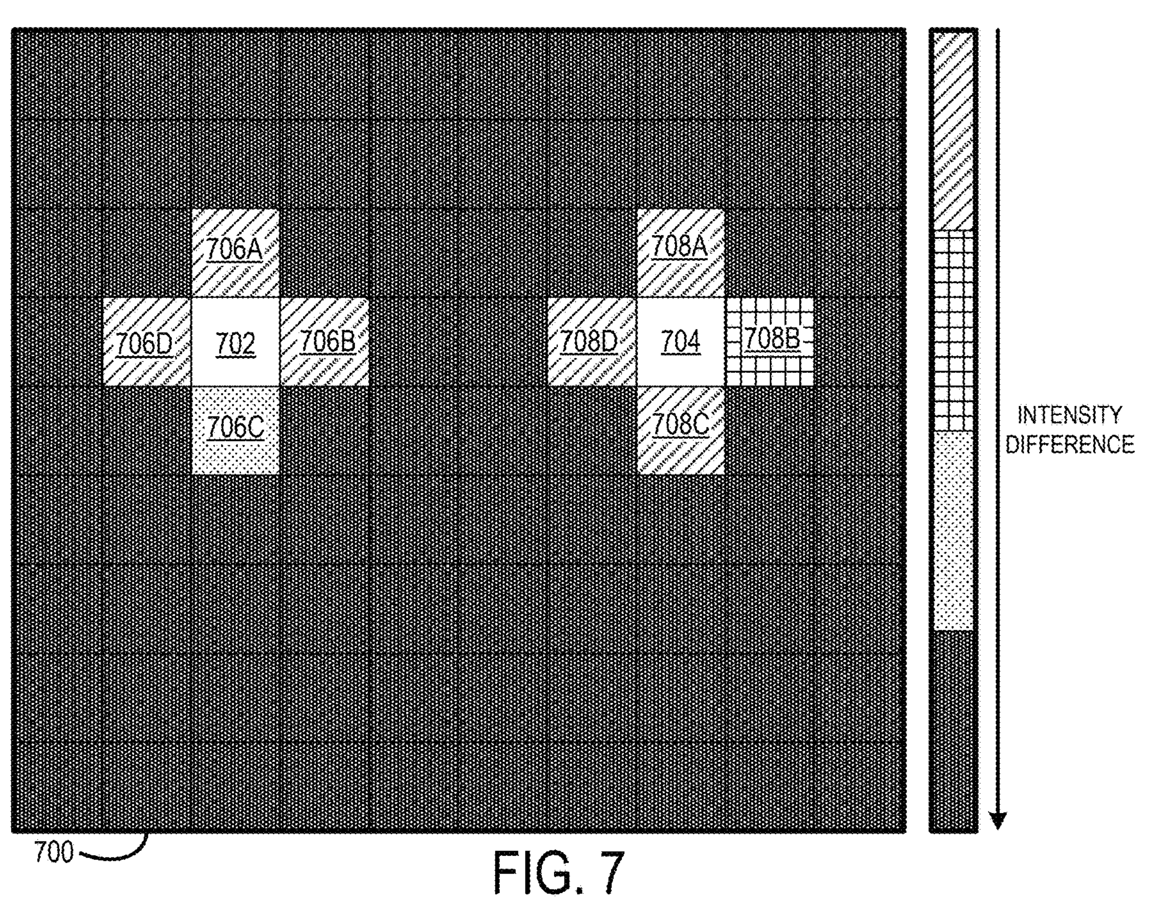
FIG. 7 shows an example two-dimensional plot of native intensity values output by a beam profiler based on detecting diffuse laser light through an optical mask.

FIG. 7 shows an example two-dimensional plot 700 of native intensity values output by the beam profiler 100 based on detecting diffuse laser light 316 through the optical mask 354. In the illustrated example, the white pixels 702, 704 are the designated pixels that the optical mask 354 allows to receive the diffuse laser light 316. Ideally, a first subset of neighboring pixels 706 including pixels 706A, 706B, 706C, 706D that surround a first designated pixel 702 should be dark (i.e., outputting no-light values). However, due to light blooming from the first designated pixel 702A, the neighboring pixels 706A, 706B, 706C, 706D output intensity values that do not correlate to the no-light value. Likewise, a second subset of neighboring pixels 708 including pixels 708A, 708B, 708C, 708D that surround a second designated pixel 704 should be dark (i.e., outputting no-light values). However, due to light blooming from the second designated pixel 704, the neighboring pixels 708A, 708B, 708C, 708D output intensity values that do not correlate to the no-light value. Note that different neighboring pixels output different intensity values, and thus have to be compensated for differently. Accordingly, different offset values are applied to correct the different native intensity values of the neighboring pixels. For example, a first corrective offset value is applied to pixel 706C. A second corrective offset value that is greater than the first corrective offset value is applied to pixel 708B. A third corrective offset value that is greater than the second corrective offset value is applied to pixels 706A, 706B, 706D, 708A, 708C, 708D. The different corrective offset values compensate for the differences between the native intensity values output by the neighboring pixels, such that the neighboring pixels output calibrated intensity values that correlate to the expected no-light value, since the neighboring pixels are covered by the optical mask 354. Note that the other dark pixels in the two-dimensional plot 700 are blocked by the optical mask 354 from receiving the diffuse laser light 316 and are spaced far enough from the designated pixels 702, 704 to be unaffected by any light bloom or bleed through from the designated pixels 702, 704.

Figure 8:
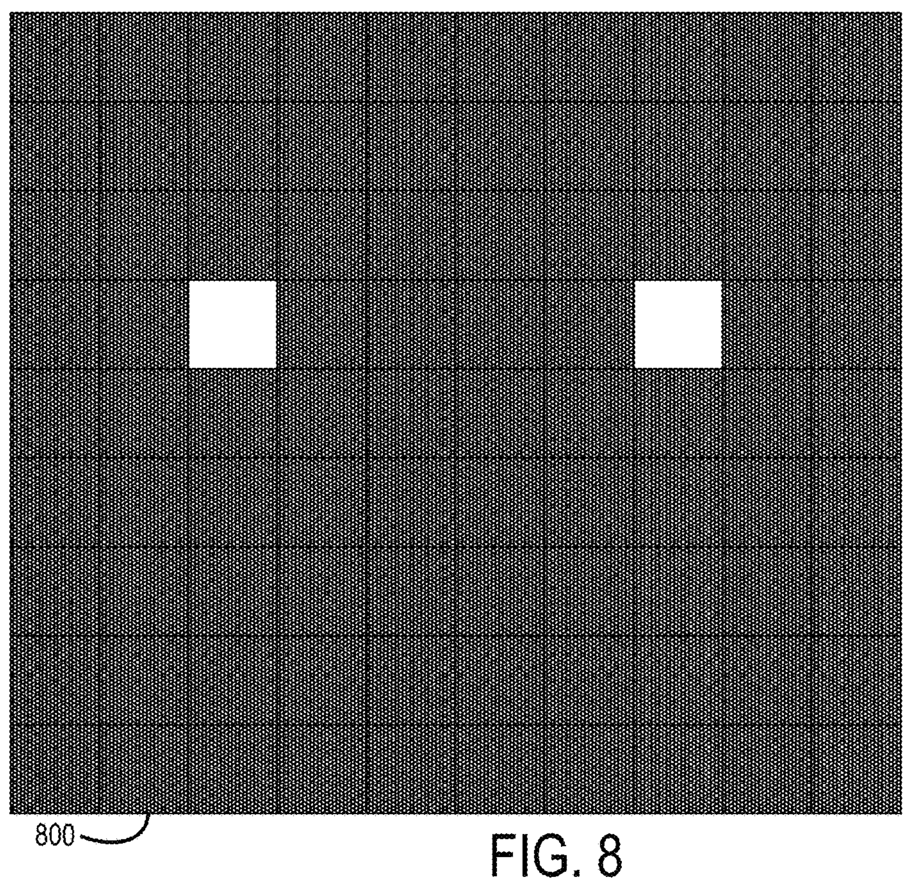
FIG. 8 shows an example two-dimensional plot of calibrated intensity values that is generated by applying corrective offset values to the two-dimensional plot of native intensity values of FIG. 7.

FIG. 8 shows an example two-dimensional plot 800 of calibrated intensity values that is generated by applying corrective offset values to the two-dimensional plot 700 of native intensity values of FIG. 7. Such calibration compensates for any light bloom that may occur between pixels of the array of pixels 106 of the beam sensor 102.

Figure 9:
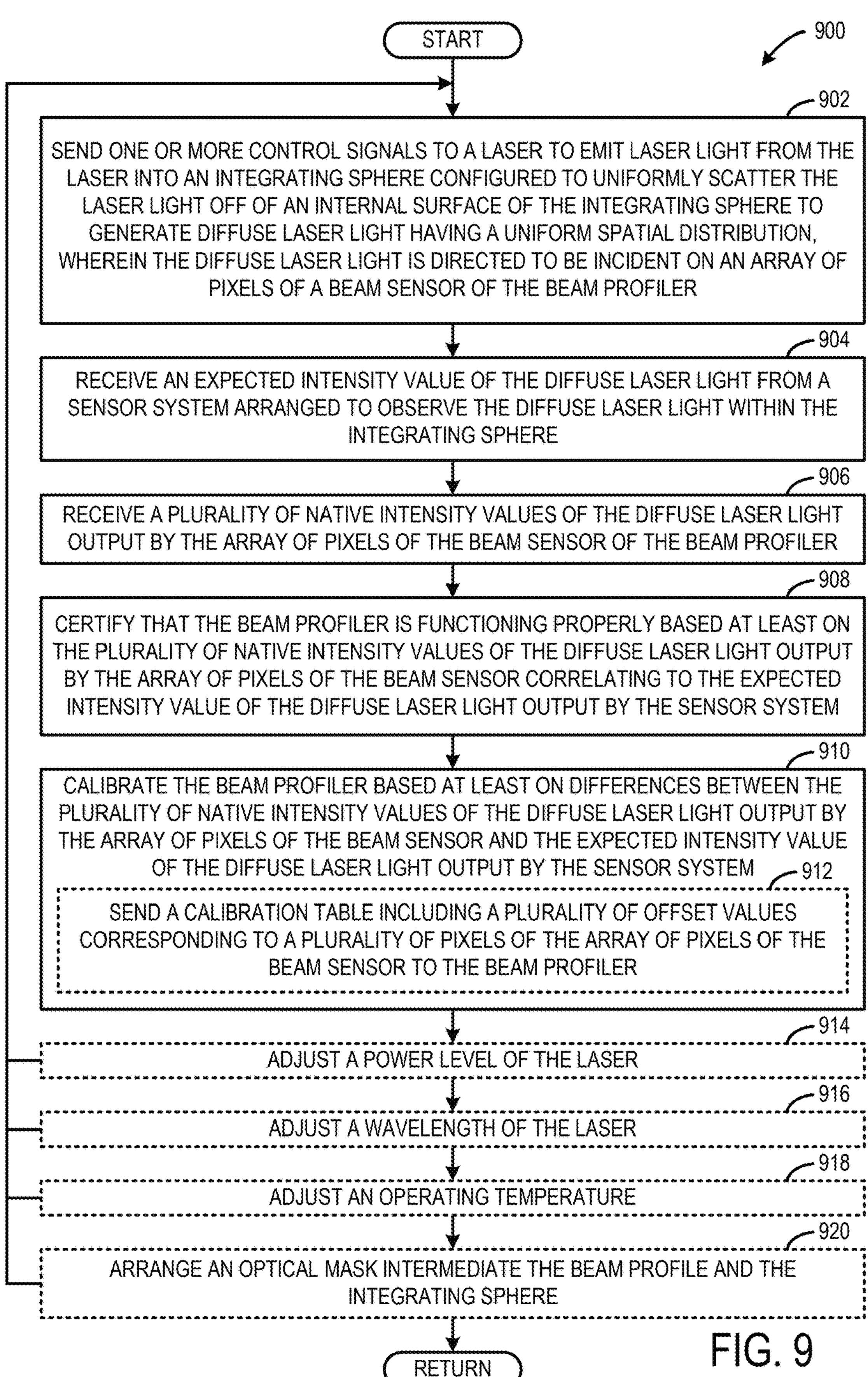
FIG. 9 shows an example computer-implemented method for certifying and/or calibrating a beam profiler.

FIG. 9 shows an example computer-implemented method 900 for certifying and/or calibrating a beam profiler. For example, the computer-implemented method 900 may be performed by the tool 300, and more particularly, the computing system 340 of the tool 300. At 902, the computer-implemented method 900 includes sending one or more control signals to a laser to emit laser light from the laser into an integrating sphere configured to uniformly scatter the laser light off of an internal surface of the integrating sphere to generate diffuse laser light having a uniform spatial distribution, wherein the diffuse laser light is directed to be incident on an array of pixels of a beam sensor of the beam profiler.

At 904, the computer-implemented method 900 includes receiving an expected intensity value of the diffuse laser light from a sensor system arranged to observe the diffuse laser light within the integrating sphere.

At 906, the computer-implemented method 900 includes receiving a plurality of native intensity values of the diffuse laser light output by the array of pixels of the beam sensor of the beam profiler.

At 908, the computer-implemented method 900 includes certifying that the beam profiler is functioning properly based at least on the plurality of native intensity values of the diffuse laser light output by the array of pixels of the beam sensor correlating to the expected intensity value of the diffuse laser light output by the sensor system.

At 910, the computer-implemented method 900 includes calibrating the beam profiler based at least on differences between the plurality of native intensity values of the diffuse laser light output by the array of pixels of the beam sensor and the expected intensity value of the diffuse laser light output by the sensor system. In some embodiments calibrating the beam profiler includes for each pixel of the array of pixels of the beam sensor that outputs a native intensity value of the diffuse laser light that does not correlate to the expected intensity value of the diffuse laser light output by the sensor system, applying a corrective offset value to the native intensity value to generate a calibrated intensity value, wherein the corrective offset value is a difference between the native intensity value and the expected intensity value.

In some embodiments, at 912, the computer-implemented method 900 may include sending a calibration table including a plurality of offset values corresponding to a plurality of pixels of the array of pixels of the beam sensor to the beam profiler. The beam profiler is configured to apply the offset values of the calibration table to a plurality of native intensity values output by a corresponding plurality of pixels of the beam sensor to generate a plurality of calibrated intensity values.

In some embodiments, at 914, the computer-implemented method 900 may include adjusting a power level of the laser and repeating the certification and/or calibration process at that different power level of the laser. The certification and/or calibration process for the beam profiler (e.g., method steps 902-910) may be repeated for a plurality of different power levels of the laser.

In some embodiments, at 916, the computer-implemented method 900 may include adjusting a wavelength of the laser and repeating the certification and/or calibration process at that different wavelength of the laser. The certification and/or calibration process for the beam profiler (e.g., method steps 902-910) may be repeated for a plurality of different wavelengths of the laser.

In some embodiments, at 918, the computer-implemented method 900 may include adjusting an operating temperature within a test chamber of the tool where the beam profiler and the laser reside and repeating the certification and/or calibration process at that different temperature. The certification and/or calibration process for the beam profiler (e.g., method steps 902-910) may be repeated for a plurality of different operating temperatures.

In some embodiments, at 920, the computer-implemented method 900 may include arranging an optical mask intermediate the beam profiler and the integrating sphere. The optical mask is configured to allow the diffuse laser light to reach a designated pixel of the array of pixels of the beam sensor and block the diffuse laser light from being incident on a subset of neighboring pixels of the array of pixels that surround the designated pixel. The certification and/or calibration process (e.g., method steps 902-910) may be performed while the designated pixel is illuminated with diffuse laser light and the optical mask block the other pixels of the array of pixels of the beam sensor from receiving the diffuse laser light. The optical mask can be adjusted to select a different designated pixel to be illuminated with the diffuse laser light and the certification and/or calibration process for the beam profiler (e.g., method steps 902-910) may be repeated. The optical mask can be repeatedly adjusted such that each pixel of the array is selected as the designated pixel and the calibration process for the beam profiler (e.g., method steps 902-910) may be repeated for each pixel.

The computer-implemented method 900 can be performed to certify a beam profiler as functioning properly or to calibrate the beam profiler on a pixel-by-pixel basis to compensate for any variations in intensity values output by particular pixels of the beam sensor relative to the expected intensity value of the diffuse laser light. Such an approach allows for a beam profiler to be certified/calibrated in a physics-based manner that otherwise was previously not available. Further, the method may be repeated with different laser parameters and/or other operation conditions to improve the robustness of the certification and/or calibration of the beam profiler. Moreover, the beam profiler may be repeatedly certified/calibrated over its operational lifespan using the computer-implemented method 900 in order to ensure that the beam profiler remains functioning properly during that time.

The methods and processes described herein may be tied to a computing system of one or more computing devices. In particular, such methods and processes may be implemented as an executable computer-application program, a network-accessible computing service, an application-programming interface (API), a library, or a combination of the above and/or other compute resources.

Figure 10:
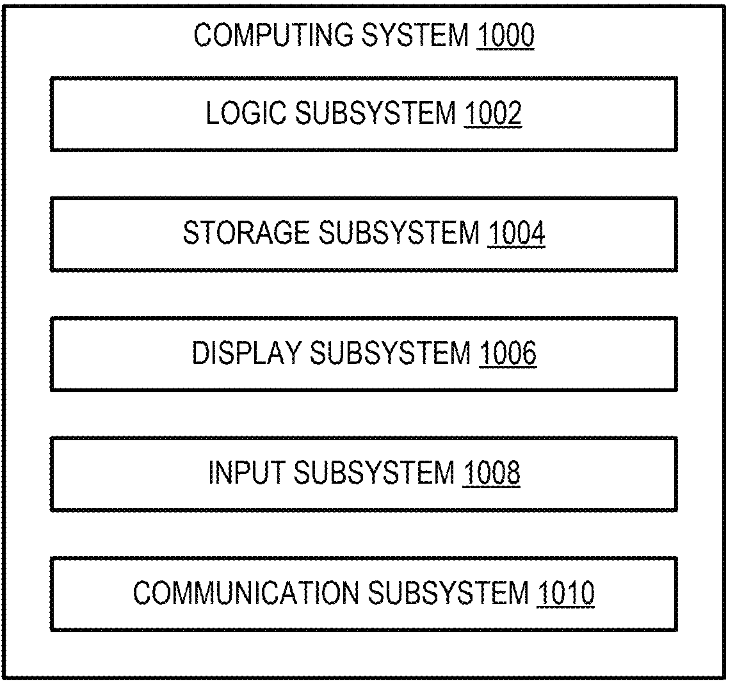
FIG. 10 shows an example computing system.

FIG. 10 schematically shows a simplified representation of a computing system 1000 configured to provide any to all of the compute functionality described herein. Computing system 1000 may take the form of one or more personal computers, network-accessible server computers, tablet computers, home-entertainment computers, gaming devices, mobile computing devices, mobile communication devices (e.g., smart phone), virtual/augmented/mixed reality computing devices, wearable computing devices, Internet of Things (IoT) devices, embedded computing devices, and/or other computing devices. For example, the computing system 1000 may be representative of the computing system 340 of FIG. 3.

Computing system 1000 includes a logic subsystem 1002 and a storage subsystem 1004. Computing system 1000 may optionally include a display subsystem 1006, input subsystem 1008, communication subsystem 1010, and/or other subsystems not shown in FIG. 10.

Logic subsystem 1002 includes one or more physical devices configured to execute instructions. For example, the logic subsystem may be configured to execute instructions that are part of one or more applications, services, or other logical constructs. The logic subsystem may include one or more hardware processors configured to execute software instructions. Additionally, or alternatively, the logic subsystem may include one or more hardware or firmware devices configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely-accessible, networked computing devices configured in a cloud-computing configuration.

Storage subsystem 1004 includes one or more physical devices configured to temporarily and/or permanently hold computer information such as data and instructions executable by the logic subsystem. When the storage subsystem includes two or more devices, the devices may be collocated and/or remotely located. Storage subsystem 1004 may include volatile, nonvolatile, dynamic, static, read/write, read-only, random-access, sequential-access, location-addressable, file-addressable, and/or content-addressable devices. Storage subsystem 1004 may include removable and/or built-in devices. When the logic subsystem executes instructions, the state of storage subsystem 1004 may be transformed—e.g., to hold different data.

Aspects of logic subsystem 1002 and storage subsystem 1004 may be integrated together into one or more hardware-logic components. Such hardware-logic components may include program- and application-specific integrated circuits (PASIC/ASICs), program- and application-specific standard products (PSSP/ASSPs), system-on-a-chip (SOC), and complex programmable logic devices (CPLDs), for example.

The logic subsystem and the storage subsystem may cooperate to instantiate one or more logic machines. As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

When included, display subsystem 1006 may be used to present a visual representation of data held by storage subsystem 1004. This visual representation may take the form of a graphical user interface (GUI). Display subsystem 1006 may include one or more display devices utilizing virtually any type of technology. In some implementations, display subsystem may include one or more virtual-, augmented-, or mixed reality displays.

When included, input subsystem 1008 may comprise or interface with one or more input devices. An input device may include a sensor device or a user input device. Examples of user input devices include a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition.

When included, communication subsystem 1010 may be configured to communicatively couple computing system 1000 with one or more other computing devices. Communication subsystem 1010 may include wired and/or wireless communication devices compatible with one or more different communication protocols. The communication subsystem may be configured for communication via personal-, local- and/or wide-area networks.

In some examples, a tool comprises a laser configured to emit laser light, an integrating sphere including an input port and an output port, the integrating sphere being configured to receive the laser light emitted from the laser via the input port and uniformly scatter the laser light off of an internal surface of the integrating sphere to generate diffuse laser light, a sensor system arranged to observe the diffuse laser light within the integrating sphere and output an expected intensity value of the diffuse laser light, an interface configured to align a beam profiler with the output port of the integrating sphere to direct the diffuse laser light to be incident on an array of pixels of a beam sensor of the beam profiler, wherein array of pixels of the beam sensor is configured to output a plurality of native intensity values of the diffuse laser light, and a computing system including a logic subsystem and a storage subsystem holding instructions executable by the logic subsystem to receive the expected intensity value of the diffuse laser light output by the sensor system, receive the plurality of native intensity values of the diffuse laser light output by the array of pixels of the beam sensor, and calibrate the beam profiler based at least on differences between the plurality of native intensity values of the diffuse laser light output by the array of pixels of the beam sensor and the expected intensity value of the diffuse laser light output by the sensor system. In this example and/or other examples, calibrating the beam profiler may include, for each pixel of the array of pixels of the beam sensor that outputs a native intensity value of the diffuse laser light that does not correlate to the expected intensity value of the diffuse laser light output by the sensor system, apply a corrective offset value to the native intensity value to generate a calibrated intensity value, wherein the corrective offset value is a difference between the native intensity value and the expected intensity value. In this example and/or other examples, calibrating the beam profiler may include sending a calibration table including a plurality of offset values corresponding to a plurality of pixels of the array of pixels of the beam sensor to the beam profiler, and wherein the beam profiler is configured to apply the offset values of the calibration table to a plurality of native intensity values output by a corresponding plurality of pixels of the beam sensor to generate a plurality of calibrated intensity values. In this example and/or other examples, the storage subsystem may hold instructions executable by the logic subsystem to certify that the beam profiler is functioning properly based at least on the plurality of native intensity values of the diffuse laser light output by the array of pixels of the beam sensor correlating to the expected intensity value of the diffuse laser light output by the sensor system. In this example and/or other examples, the sensor system may include a photon counter configured to output the expected intensity value of the diffuse laser light. In this example and/or other examples, the sensor system may include a spectrometer configured to output an expected wavelength value of the diffuse laser light, and wherein the storage subsystem may hold instructions executable by the logic subsystem to receive the expected wavelength value of the diffuse laser light output by the spectrometer, and calibrate the beam profiler further based at least on the expected wavelength value of the diffuse laser light output by the spectrometer. In this example and/or other examples, the laser may be configured to sequentially output a plurality of samples of laser light at a plurality of different power levels into the integrating sphere, wherein the integrating sphere may be configured to generate a plurality of samples of diffuse laser light at the plurality of different power levels, wherein the plurality of samples of diffuse laser light may be sequentially directed to be incident on the array of pixels of the beam sensor of the beam profiler, and wherein the storage subsystem may hold instructions executable by the logic subsystem to receive a plurality of expected intensity values of the plurality of samples of diffuse laser light at the plurality of different power levels output by the sensor system, receive a plurality of sets of native intensity values corresponding to the plurality of samples of diffuse laser light at the plurality of different power levels output by the beam profiler, and calibrate the beam profiler based at least on differences between the plurality of sets of native intensity values corresponding to the plurality of samples of diffuse laser light at the plurality of different power levels output by the beam profiler and the plurality of expected intensity values of the plurality of samples of diffuse laser light at the plurality of different power levels output by the sensor system. In this example and/or other examples, the laser may be configured to sequentially emit a plurality of samples of laser light at a plurality of different wavelengths into the integrating sphere, wherein the integrating sphere may be configured to generate a plurality of samples of diffuse laser light at the plurality of different wavelengths, wherein the plurality of samples of diffuse laser light may be sequentially directed to be incident on the array of pixels of the beam sensor of the beam profiler, and wherein the storage subsystem may hold instructions executable by the logic subsystem to receive a plurality of expected intensity values of the plurality of samples of diffuse laser light at the plurality of different wavelengths output by the sensor system, receive a plurality of sets of native intensity values corresponding to the plurality of samples of diffuse laser light at the plurality of different wavelengths output by the beam profiler, and calibrate the beam profiler based at least on differences between the plurality of sets of native intensity values corresponding to the plurality of samples of diffuse laser light at the plurality of different wavelengths output by the beam profiler and the plurality of expected intensity values of the plurality of samples of diffuse laser light at the plurality of different wavelengths output by the sensor system. In this example and/or other examples, the tool may further comprise a test chamber that contains the laser, the integrating sphere, the sensor system, and the beam profiler, wherein the test chamber may be configured to regulate operating conditions within the test chamber. In this example and/or other examples, the tool further comprise a temperature control element that is configured to adjust a temperature within the test chamber to a plurality of different temperatures, wherein the laser may be configured to sequentially output a plurality of samples of laser light at the plurality of different temperatures in the test chamber, wherein the integrating sphere may be configured to generate a plurality of samples of diffuse laser light at the plurality of different temperatures, wherein the plurality of samples of diffuse laser light may be sequentially directed to be incident on the array of pixels of the beam sensor of the beam profiler, and wherein the storage subsystem may hold instructions executable by the logic subsystem to receive a plurality of expected intensity values of the plurality of samples of diffuse laser light at the plurality of different temperatures output by the sensor system, receive a plurality of sets of native intensity values corresponding to the plurality of samples of diffuse laser light at the plurality of different temperatures output by the beam profiler, and calibrate the beam profiler based at least on differences between the plurality of sets of native intensity values corresponding to the plurality of samples of diffuse laser light at the plurality of different temperatures output by the beam profiler and the plurality of expected intensity values of the plurality of samples of diffuse laser light at the plurality of different temperatures output by the sensor system. In this example and/or other examples, the tool may further comprise an optical mask arranged intermediate the beam profiler and the output port of the integrating sphere and configured to allow the diffuse laser light to reach a designated pixel of the array of pixels of the beam sensor and block the diffuse laser light from being incident on a subset of neighboring pixels of the array of pixels that surround the designated pixel, and wherein the storage subsystem may hold instructions executable by the logic subsystem to receive a plurality of native intensity values corresponding to the subset of neighboring pixels, and for each pixel of the subset of neighboring pixels of the beam sensor that outputs a native intensity value that does not correlate to a no-light value, apply a corrective offset value to the native intensity value to generate the no-light value.

In another example, a computer-implemented method for calibrating a beam profiler comprises sending one or more control signals to a laser to emit laser light from the laser into an integrating sphere configured to uniformly scatter the laser light off of an internal surface of the integrating sphere to generate diffuse laser light, wherein the diffuse laser light is directed to be incident on an array of pixels of a beam sensor of the beam profiler, receiving an expected intensity value of the diffuse laser light from a sensor system arranged to observe the diffuse laser light within the integrating sphere, receiving a plurality of native intensity values of the diffuse laser light output by the array of pixels of the beam sensor of the beam profiler, and calibrating the beam profiler based at least on differences between the plurality of native intensity values of the diffuse laser light output by the array of pixels of the beam sensor and the expected intensity value of the diffuse laser light output by the sensor system. In this example and/or other examples, calibrating the beam profiler may include for each pixel of the array of pixels of the beam sensor that outputs a native intensity value of the diffuse laser light that does not correlate to the expected intensity value of the diffuse laser light output by the sensor system, apply a corrective offset value to the native intensity value to generate a calibrated intensity value, wherein the corrective offset value may be a difference between the native intensity value and the expected intensity value. In this example and/or other examples, calibrating the beam profiler may include sending a calibration table including a plurality of offset values corresponding to a plurality of pixels of the array of pixels of the beam sensor to the beam profiler, and wherein the beam profiler may be configured to apply the offset values of the calibration table to a plurality of native intensity values output by a corresponding plurality of pixels of the beam sensor to generate a plurality of calibrated intensity values. In this example and/or other examples, the computer-implemented method may further comprise certifying that the beam profiler is functioning properly based at least on the plurality of native intensity values of the diffuse laser light output by the array of pixels of the beam sensor correlating to the expected intensity value of the diffuse laser light output by the sensor system. In this example and/or other examples, the computer-implemented method may further comprise sending control signals to the laser to sequentially emit a plurality of samples of laser light at a plurality of different power levels into the integrating sphere, wherein the integrating sphere may be configured to generate a plurality of samples of diffuse laser light at the plurality of different power levels, wherein the plurality of samples of diffuse laser light may be sequentially directed to be incident on the array of pixels of the beam sensor of the beam profiler, receiving a plurality of expected intensity values of the plurality of samples of diffuse laser light at the plurality of different power levels output by the sensor system, receiving a plurality of sets of native intensity values corresponding to the plurality of samples of diffuse laser light at the plurality of different power levels output by the beam profiler, and calibrating the beam profiler based at least on differences between the plurality of sets of native intensity values corresponding to the plurality of samples of diffuse laser light at the plurality of different power levels output by the beam profiler and the plurality of expected intensity values of the plurality of samples of diffuse laser light at the plurality of different power levels output by the sensor system. In this example and/or other examples, the computer-implemented method may further comprise sending control signals to the laser to sequentially output a plurality of samples of laser light at a plurality of different wavelengths into the integrating sphere, wherein the integrating sphere is configured to generate a plurality of samples of diffuse laser light at the plurality of different wavelengths, wherein the plurality of samples of diffuse laser light are sequentially directed to be incident on the array of pixels of the beam sensor of the beam profiler, receiving a plurality of expected intensity values of the plurality of samples of diffuse laser light at the plurality of different wavelengths output by the sensor system, receiving a plurality of sets of native intensity values corresponding to the plurality of samples of diffuse laser light at the plurality of different wavelengths output by the beam profiler, and calibrating the beam profiler based at least on differences between the plurality of sets of native intensity values corresponding to the plurality of samples of diffuse laser light at the plurality of different wavelengths output by the beam profiler and the plurality of expected intensity values of the plurality of samples of diffuse laser light at the plurality of different wavelengths output by the sensor system. In this example and/or other examples, the computer-implemented method may further comprise sending control signals to a temperature control element to adjust a temperature within a test chamber containing at least the laser, the integrating sphere, and the beam profiler to a plurality of different temperatures, sending control signals to the laser to sequentially emit a plurality of samples of laser light into the integrating sphere while at the plurality of different temperatures, wherein the integrating sphere is configured to generate a plurality of samples of diffuse laser light while at the plurality of different temperatures, wherein the plurality of samples of diffuse laser light are sequentially directed to be incident on the array of pixels of the beam sensor of the beam profiler, receiving a plurality of expected intensity values of the plurality of samples of diffuse laser light output by the sensor system while at the plurality of different temperatures, receiving a plurality of sets of native intensity values corresponding to the plurality of samples of diffuse laser light output by the beam profiler while at the plurality of different temperatures, and calibrating the beam profiler based at least on differences between the plurality of sets of native intensity values corresponding to the plurality of samples of diffuse laser light output by the beam profiler while at the plurality of different temperatures and the plurality of expected intensity values of the plurality of samples of diffuse laser light output by the sensor system while at the plurality of different temperatures. In this example and/or other examples, an optical mask may be arranged intermediate the beam profiler and the integrating sphere and configured to allow the diffuse laser light to reach a designated pixel of the array of pixels of the beam sensor and block the diffuse laser light from being incident on a subset of neighboring pixels of the array of pixels that surround the designated pixel, and wherein the computer-implemented method may further comprise receiving a plurality of native intensity values corresponding to the subset of neighboring pixels, and for each pixel of the subset of neighboring pixels of the beam sensor that outputs a native intensity value that does not correlate to a no-light value, applying a corrective offset value to the native intensity value to generate the no-light value.

In yet another example, a tool comprises a laser configured to emit laser light, an integrating sphere including an input port and an output port, the integrating sphere being configured to receive the laser light emitted from the laser via the input port and uniformly scatter the laser light off of an internal surface of the integrating sphere to generate diffuse laser light, a sensor system arranged to observe the diffuse laser light within the integrating sphere and output an expected intensity value of the diffuse laser light, an interface configured to align a beam profiler with the output port of the integrating sphere to direct the diffuse laser light to be incident on an array of pixels of a beam sensor of the beam profiler, wherein array of pixels of the beam sensor is configured to output a plurality of native intensity values of the diffuse laser light, and a computing system including a logic subsystem and a storage subsystem holding instructions executable by the logic subsystem to receive the expected intensity value of the diffuse laser light output by the sensor system, receive the plurality of native intensity values of the diffuse laser light output by the array of pixels of the beam sensor, certify that the beam profiler is functioning properly based at least on the plurality of native intensity values of the diffuse laser light output by the array of pixels of the beam sensor correlating to the expected intensity value of the diffuse laser light output by the sensor system, and calibrate the beam profiler based at least on differences between the plurality of native intensity values of the diffuse laser light output by the array of pixels of the beam sensor and the expected intensity value of the diffuse laser light output by the sensor system.

This disclosure is presented by way of example and with reference to the associated drawing figures. Components, process steps, and other elements that may be substantially the same in one or more of the figures are identified coordinately and are described with minimal repetition. It will be noted, however, that elements identified coordinately may also differ to some degree. It will be further noted that some figures may be schematic and not drawn to scale. The various drawing scales, aspect ratios, and numbers of components shown in the figures may be purposely distorted to make certain features or relationships easier to see.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A tool comprising:

a laser configured to emit laser light;

an integrating sphere including an input port and an output port, the integrating sphere being configured to receive the laser light emitted from the laser via the input port and uniformly scatter the laser light off of an internal surface of the integrating sphere to generate diffuse laser light;

a sensor system arranged to observe the diffuse laser light within the integrating sphere and output an expected intensity value of the diffuse laser light;

an interface configured to align a beam profiler with the output port of the integrating sphere to direct the diffuse laser light to be incident on an array of pixels of a beam sensor of the beam profiler, wherein array of pixels of the beam sensor is configured to output a plurality of native intensity values of the diffuse laser light; and a computing system including a logic subsystem and a storage subsystem holding instructions executable by the logic subsystem to:

receive the expected intensity value of the diffuse laser light output by the sensor system;

receive the plurality of native intensity values of the diffuse laser light output by the array of pixels of the beam sensor; and calibrate the beam profiler based at least on differences between the plurality of native intensity values of the diffuse laser light output by the array of pixels of the beam sensor and the expected intensity value of the diffuse laser light output by the sensor system.

2. The tool of claim 1, wherein calibrating the beam profiler includes, for each pixel of the array of pixels of the beam sensor that outputs a native intensity value of the diffuse laser light that does not correlate to the expected intensity value of the diffuse laser light output by the sensor system, apply a corrective offset value to the native intensity value to generate a calibrated intensity value, wherein the corrective offset value is a difference between the native intensity value and the expected intensity value.

3. The tool of claim 2, wherein calibrating the beam profiler includes sending a calibration table including a plurality of offset values corresponding to a plurality of pixels of the array of pixels of the beam sensor to the beam profiler, and wherein the beam profiler is configured to apply the offset values of the calibration table to a plurality of native intensity values output by a corresponding plurality of pixels of the beam sensor to generate a plurality of calibrated intensity values.

4. The tool of claim 1, wherein the storage subsystem holds instructions executable by the logic subsystem to:

certify that the beam profiler is functioning properly based at least on the plurality of native intensity values of the diffuse laser light output by the array of pixels of the beam sensor correlating to the expected intensity value of the diffuse laser light output by the sensor system.

5. The tool of claim 1, wherein the sensor system includes a photon counter configured to output the expected intensity value of the diffuse laser light.

6. The tool of claim 1, wherein the sensor system includes a spectrometer configured to output an expected wavelength value of the diffuse laser light, and wherein the storage subsystem holds instructions executable by the logic subsystem to:

receive the expected wavelength value of the diffuse laser light output by the spectrometer; and calibrate the beam profiler further based at least on the expected wavelength value of the diffuse laser light output by the spectrometer.

7. The tool of claim 1, wherein the laser is configured to sequentially output a plurality of samples of laser light at a plurality of different power levels into the integrating sphere, wherein the integrating sphere is configured to generate a plurality of samples of diffuse laser light at the plurality of different power levels, wherein the plurality of samples of diffuse laser light are sequentially directed to be incident on the array of pixels of the beam sensor of the beam profiler, and wherein the storage subsystem holds instructions executable by the logic subsystem to:

receive a plurality of expected intensity values of the plurality of samples of diffuse laser light at the plurality of different power levels output by the sensor system;

receive a plurality of sets of native intensity values corresponding to the plurality of samples of diffuse laser light at the plurality of different power levels output by the beam profiler; and calibrate the beam profiler based at least on differences between the plurality of sets of native intensity values corresponding to the plurality of samples of diffuse laser light at the plurality of different power levels output by the beam profiler and the plurality of expected intensity values of the plurality of samples of diffuse laser light at the plurality of different power levels output by the sensor system.

8. The tool of claim 1, wherein the laser is configured to sequentially emit a plurality of samples of laser light at a plurality of different wavelengths into the integrating sphere, wherein the integrating sphere is configured to generate a plurality of samples of diffuse laser light at the plurality of different wavelengths, wherein the plurality of samples of diffuse laser light are sequentially directed to be incident on the array of pixels of the beam sensor of the beam profiler, and wherein the storage subsystem holds instructions executable by the logic subsystem to:

receive a plurality of expected intensity values of the plurality of samples of diffuse laser light at the plurality of different wavelengths output by the sensor system;

receive a plurality of sets of native intensity values corresponding to the plurality of samples of diffuse laser light at the plurality of different wavelengths output by the beam profiler; and calibrate the beam profiler based at least on differences between the plurality of sets of native intensity values corresponding to the plurality of samples of diffuse laser light at the plurality of different wavelengths output by the beam profiler and the plurality of expected intensity values of the plurality of samples of diffuse laser light at the plurality of different wavelengths output by the sensor system.

9. The tool of claim 1, further comprising a test chamber that contains the laser, the integrating sphere, the sensor system, and the beam profiler, wherein the test chamber is configured to regulate operating conditions within the test chamber.

10. The tool of claim 9, further comprising:

a temperature control element that is configured to adjust a temperature within the test chamber to a plurality of different temperatures;

wherein the laser is configured to sequentially output a plurality of samples of laser light at the plurality of different temperatures in the test chamber, wherein the integrating sphere is configured to generate a plurality of samples of diffuse laser light at the plurality of different temperatures, wherein the plurality of samples of diffuse laser light are sequentially directed to be incident on the array of pixels of the beam sensor of the beam profiler, and wherein the storage subsystem holds instructions executable by the logic subsystem to:

receive a plurality of expected intensity values of the plurality of samples of diffuse laser light at the plurality of different temperatures output by the sensor system;

receive a plurality of sets of native intensity values corresponding to the plurality of samples of diffuse laser light at the plurality of different temperatures output by the beam profiler; and calibrate the beam profiler based at least on differences between the plurality of sets of native intensity values corresponding to the plurality of samples of diffuse laser light at the plurality of different temperatures output by the beam profiler and the plurality of expected intensity values of the plurality of samples of diffuse laser light at the plurality of different temperatures output by the sensor system.

11. The tool of claim 1, further comprising:

an optical mask arranged intermediate the beam profiler and the output port of the integrating sphere and configured to allow the diffuse laser light to reach a designated pixel of the array of pixels of the beam sensor and block the diffuse laser light from being incident on a subset of neighboring pixels of the array of pixels that surround the designated pixel; and wherein the storage subsystem holds instructions executable by the logic subsystem to:

receive a plurality of native intensity values corresponding to the subset of neighboring pixels; and for each pixel of the subset of neighboring pixels of the beam sensor that outputs a native intensity value that does not correlate to a no-light value, apply a corrective offset value to the native intensity value to generate the no-light value.

12. A computer-implemented method for calibrating a beam profiler, the computer-implemented method comprising:

sending one or more control signals to a laser to emit laser light from the laser into an integrating sphere configured to uniformly scatter the laser light off of an internal surface of the integrating sphere to generate diffuse laser light, wherein the diffuse laser light is directed to be incident on an array of pixels of a beam sensor of the beam profiler;

receiving an expected intensity value of the diffuse laser light from a sensor system arranged to observe the diffuse laser light within the integrating sphere;

receiving a plurality of native intensity values of the diffuse laser light output by the array of pixels of the beam sensor of the beam profiler; and calibrating the beam profiler based at least on differences between the plurality of native intensity values of the diffuse laser light output by the array of pixels of the beam sensor and the expected intensity value of the diffuse laser light output by the sensor system.

13. The computer-implemented method of claim 12, wherein calibrating the beam profiler includes for each pixel of the array of pixels of the beam sensor that outputs a native intensity value of the diffuse laser light that does not correlate to the expected intensity value of the diffuse laser light output by the sensor system, apply a corrective offset value to the native intensity value to generate a calibrated intensity value, wherein the corrective offset value is a difference between the native intensity value and the expected intensity value.

14. The computer-implemented method of claim 13, wherein calibrating the beam profiler includes sending a calibration table including a plurality of offset values corresponding to a plurality of pixels of the array of pixels of the beam sensor to the beam profiler, and wherein the beam profiler is configured to apply the offset values of the calibration table to a plurality of native intensity values output by a corresponding plurality of pixels of the beam sensor to generate a plurality of calibrated intensity values.

15. The computer-implemented method of claim 12, further comprising:

certifying that the beam profiler is functioning properly based at least on the plurality of native intensity values of the diffuse laser light output by the array of pixels of the beam sensor correlating to the expected intensity value of the diffuse laser light output by the sensor system.

16. The computer-implemented method of claim 12, further comprising:

sending control signals to the laser to sequentially emit a plurality of samples of laser light at a plurality of different power levels into the integrating sphere, wherein the integrating sphere is configured to generate a plurality of samples of diffuse laser light at the plurality of different power levels, wherein the plurality of samples of diffuse laser light are sequentially directed to be incident on the array of pixels of the beam sensor of the beam profiler;

receiving a plurality of expected intensity values of the plurality of samples of diffuse laser light at the plurality of different power levels output by the sensor system;

receiving a plurality of sets of native intensity values corresponding to the plurality of samples of diffuse laser light at the plurality of different power levels output by the beam profiler; and calibrating the beam profiler based at least on differences between the plurality of sets of native intensity values corresponding to the plurality of samples of diffuse laser light at the plurality of different power levels output by the beam profiler and the plurality of expected intensity values of the plurality of samples of diffuse laser light at the plurality of different power levels output by the sensor system.

17. The computer-implemented method of claim 12, further comprising:

sending control signals to the laser to sequentially output a plurality of samples of laser light at a plurality of different wavelengths into the integrating sphere, wherein the integrating sphere is configured to generate a plurality of samples of diffuse laser light at the plurality of different wavelengths, wherein the plurality of samples of diffuse laser light are sequentially directed to be incident on the array of pixels of the beam sensor of the beam profiler;

receiving a plurality of expected intensity values of the plurality of samples of diffuse laser light at the plurality of different wavelengths output by the sensor system;

receiving a plurality of sets of native intensity values corresponding to the plurality of samples of diffuse laser light at the plurality of different wavelengths output by the beam profiler; and calibrating the beam profiler based at least on differences between the plurality of sets of native intensity values corresponding to the plurality of samples of diffuse laser light at the plurality of different wavelengths output by the beam profiler and the plurality of expected intensity values of the plurality of samples of diffuse laser light at the plurality of different wavelengths output by the sensor system.

18. The computer-implemented method of claim 12, further comprising:

sending control signals to a temperature control element to adjust a temperature within a test chamber containing at least the laser, the integrating sphere, and the beam profiler to a plurality of different temperatures;

sending control signals to the laser to sequentially emit a plurality of samples of laser light into the integrating sphere while at the plurality of different temperatures, wherein the integrating sphere is configured to generate a plurality of samples of diffuse laser light while at the plurality of different temperatures, wherein the plurality of samples of diffuse laser light are sequentially directed to be incident on the array of pixels of the beam sensor of the beam profiler;

receiving a plurality of expected intensity values of the plurality of samples of diffuse laser light output by the sensor system while at the plurality of different temperatures;

receiving a plurality of sets of native intensity values corresponding to the plurality of samples of diffuse laser light output by the beam profiler while at the plurality of different temperatures; and calibrating the beam profiler based at least on differences between the plurality of sets of native intensity values corresponding to the plurality of samples of diffuse laser light output by the beam profiler while at the plurality of different temperatures and the plurality of expected intensity values of the plurality of samples of diffuse laser light output by the sensor system while at the plurality of different temperatures.

19. The computer-implemented method of claim 12, wherein an optical mask is arranged intermediate the beam profiler and the integrating sphere and configured to allow the diffuse laser light to reach a designated pixel of the array of pixels of the beam sensor and block the diffuse laser light from being incident on a subset of neighboring pixels of the array of pixels that surround the designated pixel, and wherein the method further comprises:

receiving a plurality of native intensity values corresponding to the subset of neighboring pixels; and for each pixel of the subset of neighboring pixels of the beam sensor that outputs a native intensity value that does not correlate to a no-light value, applying a corrective offset value to the native intensity value to generate the no-light value.

20. A tool comprising:

a laser configured to emit laser light;

an integrating sphere including an input port and an output port, the integrating sphere being configured to receive the laser light emitted from the laser via the input port and uniformly scatter the laser light off of an internal surface of the integrating sphere to generate diffuse laser light;

a sensor system arranged to observe the diffuse laser light within the integrating sphere and output an expected intensity value of the diffuse laser light;

an interface configured to align a beam profiler with the output port of the integrating sphere to direct the diffuse laser light to be incident on an array of pixels of a beam sensor of the beam profiler, wherein array of pixels of the beam sensor is configured to output a plurality of native intensity values of the diffuse laser light; and a computing system including a logic subsystem and a storage subsystem holding instructions executable by the logic subsystem to:

receive the expected intensity value of the diffuse laser light output by the sensor system;

receive the plurality of native intensity values of the diffuse laser light output by the array of pixels of the beam sensor;

certify that the beam profiler is functioning properly based at least on the plurality of native intensity values of the diffuse laser light output by the array of pixels of the beam sensor correlating to the expected intensity value of the diffuse laser light output by the sensor system; and calibrate the beam profiler based at least on differences between the plurality of native intensity values of the diffuse laser light output by the array of pixels of the beam sensor and the expected intensity value of the diffuse laser light output by the sensor system.

* * * * *